(12) United States Patent
Arazi et al.

(10) Patent No.: US 7,917,549 B2
(45) Date of Patent: Mar. 29, 2011

(54) DATABASE INTERFACE GENERATOR

(75) Inventors: Nir Arazi, Nahariya (IL); Eyal Mush, Qiryat-Motzkin (IL); Ronen Cohen, Nahariya (IL)

(73) Assignee: SAP AG, Walldorf (DE)

( * ) Notice: Subject to any disclaimer, the term of this patent is extended or adjusted under 35 U.S.C. 154(b) by 534 days.

(21) Appl. No.: 11/766,220

(22) Filed: Jun. 21, 2007

(65) Prior Publication Data

US 2009/0012986 A1 Jan. 8, 2009

(51) Int. Cl.
*G06F 7/00* (2006.01)
*G06F 17/30* (2006.01)
(52) U.S. Cl. ...................................................... 707/805
(58) Field of Classification Search .................. 707/805, 707/999.102
See application file for complete search history.

(56) References Cited

U.S. PATENT DOCUMENTS

| 2005/0080614 A1* | 4/2005 | Bennett ............................ 704/9 |
| 2005/0102284 A1* | 5/2005 | Srinivasan et al. ................ 707/4 |
| 2008/0120129 A1* | 5/2008 | Seubert et al. .................... 705/1 |

* cited by examiner

*Primary Examiner* — Hosain T Alam
*Assistant Examiner* — Van H Oberly
(74) *Attorney, Agent, or Firm* — Buckley, Maschoff & Talwalkar LLC

(57) ABSTRACT

Enables a database generator interface configured to map complex constructs and semantics so internal complexities are hidden while providing efficient internal storage and speed. Extracts and analyzes complex relationships in database and exposes schema as XSD to allow for external interfacing. Presents a list of tables and fields that exist in database and accepts user input to determine which tables and fields to create an interface for. Lookup fields are listed which allow for user input for specifying which fields to create XSD enumeration lists for. The generated XSD file may be saved and utilized by other mapping tools to allow for interfacing with other databases. Mapping the schema of a extended SQL database allows for users with limited understanding of the internals of the extended SQL database to connect the database to other systems using commonly available tools. May be coupled with web services to provide universal access.

19 Claims, 11 Drawing Sheets

| Record Detail | Language Detail | Validations | Assignments | Workflows | Search Selections |
|---|---|---|---|---|---|

| | | | Masks | | |
|---|---|---|---|---|---|
| MDM Partner ID | 3 | | | | |
| Partner Number | 1 | | | | |
| Full Name | Dear Sir Ronen Cohen | | | | |
| Full Address | 12 herzel, Apt 17, Nahariya, Haifa 12345 Israel | | Address [2 of 2] ☑ Filter | N \| 44 \| Herzel \| 17 \| Nahariya \| Haifa \| 12345 \| Israel |
| Category | Person | | | | N \| 23 \| Adam Hcohen \| 2 \| Haifa \| Haifa \| 14523 \| Israel |
| Academic Title | Dr. | | | | |
| Correspondence Language | Indonesian | | | | Is Standard Address: N |
| Country of Origin | Andorra | | | | House Number: 23 |
| Gender | male | | | | Street: Adam Hcohen |
| Nationality | Austrian | | Tax Number [0 of 0] ☑ Filter | | Apartment: 2 |
| Partner Title | Dear Sir | | | | City: Haifa |
| Name 1/Last Name | Cohen | | | | Region: Haifa |
| Name 2/First Name | Ronen | | | | Postal Code: 14523 |
| Name 3/Middle Name | | | | | Country: Israel |
| Name 4/Birth Name | | | | | P.O. Box: 52314 |
| House Number | 12 | | | | Phone Number: 04-9999998 |
| Street | herzel | | | | Fax Number: 04-9999997 |
| Apartment | 17 | | | | E-mail Address: asaf.ddd@sap.com |
| City | Nahariya | | | | Address Usage: Distribute goods; Invo |
| Region | Haifa | | | | Address Number: x |
| Postal Code | 12345 | | | | |
| Country | Israel | | | | |
| P.O. Box | 10201 | | | | |
| Address Usage | Bill-to party address; Invoice address | | | | |

FIG. 11

DATABASE INTERFACE GENERATOR

BACKGROUND OF THE INVENTION

1. Field of the Invention

Embodiments of the invention described herein pertain to the field of computer systems. More particularly, but not by way of limitation, one or more embodiments of the invention enable a database interface generator configured to map complex constructs and semantics to a standardized interface that hides internal complexities while providing for efficient internal storage and speed.

2. Description of the Related Art

There are currently no known systems that generate an interface to a database that includes relationships such as taxonomy, families, qualifiers, relationships, non-field attributes, multi-valued fields or indirect lookups based on these constructs. Currently available systems provide lowest common denominator interfaces that build upon standard SQL data types and structures. Existing databases for example do not generally utilize or build upon non-standard structures such as taxonomy, families, qualifiers, relationships, non-field attributes, multi-valued fields or indirect lookups based on these structures. As such, most databases are inefficiently structured in a simple manner and hence exposing the schema is trivial since the mapping to XSD in this case is a direct translation process. The direct translation process iterates through the tables and fields and simply outputs the schema in XSD format.

In the case of more complex implementations that attempt to partition large data sets, most master data management systems require that product families (of which there may be thousands) be manually created by adding fields to the main data table for example. Families maintained in this direct manner using a field in the main table, must be manually moved to a different family if changes in the record result in the record no longer belonging to its original family. This direct method may require altering tens of thousands of records for a simple family change or family relationship change for example. As extending a main table to possess a family identifier is in keeping with the standard SQL layout for a table, the translation process remains trivial in that the schema is iterated through to provide a direct XSD schema output file that corresponds to the database schema. The remaining extended data types such as qualifiers are not utilized by known solutions and hence sparsely populated tables result.

For at least the limitations described above there is a need for a database interface generator that is configured to map complex constructs and semantics so that internal complexities are hidden while providing for efficient internal storage and speed.

BRIEF SUMMARY OF THE INVENTION

One or more embodiments of the invention enable a database generator interface that is configured to map complex constructs and semantics so that internal complexities are hidden while providing for efficient internal storage and speed. Embodiments of the invention extract and analyze complex relationships in a database and expose the schema as XSD to allow for interfacing with the database while maintaining the internal efficiency of the complex structures utilized by the database. The system presents a list of tables and fields that exist in the database and accepts user input to determine which tables and fields to create an interface for. In addition, lookup fields are listed which allow for user input for specifying which fields to create XSD enumeration lists for. Alternatively or in combination, external databases may be utilized to create XSD enumeration lists for a given lookup. The generated XSD file may be saved and utilized by other mapping tools to allow for the interfacing with other databases. For example, creating XSD enumeration lists allows for value mapping operations to convert the values of one database to the values of another database. Mapping the schema of an extended SQL database as utilized with embodiments of the invention allows for users with limited understanding of the internals of the extended SQL database to connect with other systems using commonly available tools. Embodiments of the invention may be coupled with web services to provide for universal access to the database from any platform from any location.

Constructs that the extended SQL database utilizes include taxonomy, families, qualifiers, relationships, non-field attributes, multi-valued fields or indirect lookups based on these constructs. This complexity allows for the extended SQL database to store data in a very efficient manner while maintaining data integrity. Furthermore, modifications of the taxonomy or family hierarchy is rapid as the information that defines the taxonomy and families is indirectly stored, e.g., not stored as a field in the records of the main database table.

One or more embodiments of the invention provide an interface to a database system that implements extended SQL to bypass SQL for nearly all searching, sorting and retrieving of information. Standard SQL simply does not support the types of advanced constructs necessary for rapid access and manipulation of large data sets. The extended SQL database system includes constructs that allow for the overlay of families onto existing taxonomies without adding fields to the main database table for example. For example, if the records of a product table include a category identifier, an indirect family table may utilize the category identifier to define a set of families or hierarchy of families that extend the categories. Embodiments of the database interface generator may expose the main database table as a flat record, while internally the main database table may utilize multiple sub-tables that provide efficient storage. For example, the database may utilize indirect storage of "attributes" that apply to a subset of records in the main database table, i.e., as opposed to fields that apply to all records of the main database table. The space savings may be tremendous based on the data. In addition, the extended SQL database may include use of bit vectors that allow for linear bit operations for performing searches and queries. This type of optimization allows for nearly instantaneous drill down searching that allows for pinpointing data by narrowing selections of field values for example. The structural optimizations may or may not be exposed via the interface depending on the embodiment employed.

Generally, the extended SQL database includes one main table, but may include any number of tables which for example supplement this table. The main table includes the primary information common to all records, e.g., product records, such as SKU, product name, manufacturer and price. The extended SQL database may utilize any number of sub-tables, i.e., lookup tables that define the legal set of values that a lookup field in the main table can have. For example, the main table may utilize a lookup field called "manufacturer". A value in a particular record for the manufacturer lookup field is utilized to lookup the actual text name of the manufacturer for example. The extended SQL database may also include a taxonomy sub-table that defines a hierarchy of categories and subcategories that may utilize attributes or "subfields" to apply to particular categories rather than the entire collection of records. The extended SQL database may also utilize "qualifiers" that support large sets of sub-table records for fields that are different for each main table record. For example, a "price" qualified field allows for a particular record to have multiple prices depending on different quantities, regions, partners, etc. The use of qualified fields saves tremendous amounts of space for sparsely populated data as well.

Traditional SQL utilizes the following field types as list in the table below. None of the types are multi-value "MV". Multi-value fields allow for the storage of multiple separate values in one field. Multi-value fields allow for rapid access of multiple data elements in rapid fashion. Multi-valued fields and attributes make the structure of the extended SQL database dramatically simpler, more compact, and more searchable, by storing all the values corresponding to a particular data element in the same place. The alternative requires creating multiple fields or attributes, in some cases up to a maximum of one field or attribute for each possible value. Traditional SQL field types:

| Field Data Type | MV | SQL Server® | Oracle® | DB2® | Description |
|---|---|---|---|---|---|
| Text | no | Varchar | Varchar2 | Varchar | Text field (<=4000 chars). |
| Text Large | no | Text | CLOB | CLOB | Text field (>4000 chars). |
| Integer | no | Int | Number | Int | 4-byte integer field. |
| Real | no | Real | Number | Float | 4-byte real field. |
| Real8 | no | Float | Number | Double | 8-byte real field. |
| TimeStamp | no | DateTime | Date | Timestamp | DateTime field. |
| Boolean | no | Bit | Number | Smallint | Two-valued field. |

The extended SQL database may utilize the following field types as well:

| Field Data Type | MV | Description |
|---|---|---|
| Text Normalized | | Text field with "special" (non-alphanumeric) characters removed for searching/sorting (always displays original). |
| Name | | Text field with internal structure for storing parts of a name (prefix, first, middle, last, suffix). |
| Log | | Text Large field with internal structure for managing multiple timestamped blocks of text within a single field. |
| AutoID | | Integer field that automatically increments. |
| Currency | | Real8 field displayed with a currency symbol. |
| Measurement | ● | Real field with an associated unit of measure. |
| Date | | TimeStamp field that ignores the time part. |
| Time | | TimeStamp field that ignores the date part. |
| Create Stamp | | TimeStamp field that DB automatically sets with the date and time of record creation. |
| Time Stamp | | TimeStamp field that DB automatically updates with the date and time of modification when any of the fields being tracked are updated. |
| User Stamp | | Text field that DB automatically updates with the name of the user who makes the change when any of the fields being tracked are updated. |
| Mask | ● | Virtual field that stores an enumeration of main table records. It is never displayed but is used for searching. |
| Lookup [Flat] | ● | Field whose value(s) are a lookup into a flat table. |
| Lookup [Hierarchy] | ● | Field whose value(s) are a lookup into a hierarchy table. |
| Lookup [Taxonomy] | | Field whose single value is a lookup into a taxonomy table. |
| Lookup [Qualified] | ● | Field whose values are a lookup into a qualified table. |
| Lookup [Image] | ● | Field whose value(s) lookup into the Images table. |
| Lookup [Text Block] | ● | Field whose value(s) lookup into the Text Blocks table. |
| Lookup [Text HTML] | ● | Field whose value(s) lookup into the Text HTMLs table. |
| Lookup [PDF] | ● | Field whose value(s) lookup into the PDFs table. |

In addition, the extended SQL database may also utilize constructs that are associated with a subset of the main table records for example. These "subfields" are known as attributes or "non-field attributes". An attribute is like a field, but one that applies only to a subset of the records in the main table. By contrast, a field is part of every record in the main table. If a particular attribute can be applied to every main table record, then it should be set up as a field in the main table. For example, every record in a "products" main table probably has an item number; therefore "Item Number" is generally defined in the database as a field, and not as an attribute. Attributes may be of the types listed in the following table:

| Attribute Data Type | MV | Corresponding Field Type |
|---|---|---|
| Text | ● | Lookup [Flat] |
| Numeric | ● | Measurement |
| Coupled Numeric | ● | n/a |

In the tables above, a bullet in the column labeled "MV" means that the data type can be defined as multi-valued, so that a single field or attribute can be used to store multiple values.

A taxonomy is a general term for classification scheme. The purpose of a taxonomy is to group like things together into categories, usually based on a set of common, category-specific characteristics, or attributes. In the context of the extended SQL database, a taxonomy is what makes it possible to quickly locate a few specific records—or categories—in a database of thousands, tens of thousands, or even millions of records. A taxonomy is usually hierarchical, meaning that some categories are subcategories of other categories. For example, the hierarchical taxonomy used to classify animals, such as vertebrates is mammals->primates->chimpanzees, and so on. Each level of the hierarchy gets narrower in terms of the amount of data that it includes. In a taxonomy, every category has its own defining characteristics (in addition to those of every category above it in the hierarchy). For example, in the taxonomy of animals, primates have specific characteristics as well as those of mammals and vertebrates. In the extended SQL database, these characteristics are implemented with attributes, and correspond to fields of information that apply only to some rather than all of the main table records. For example, voltage might be an attribute that applies to motors but not to gears where both motors and gears are products in the main table. The taxonomy table includes a pool of attributes associated with it. From this pool attributes may be linked to one or more individual categories on a category-by-category basis. Attributes are indirectly associated with main table records by assigning records to categories. A record is associated with a category for example by defining the values of a field in the record that define the category. The record indirectly acquires the attributes linked to that category as well as the attributes linked to the parent category and all of the other ancestors of that category through inheritance. Thus a main table record includes common fields, inherited attributes, and category-specific attributes.

A qualified table is a special kind of lookup table that is extremely versatile. It can be used to efficiently store complex relationships between a main table record and one or more lookup table records that contain various types of additional information. A qualified table stores a set of lookup records, and also supports qualifiers, database "subfields" that apply not to the qualified table record by itself, but rather to each association of a qualified table record with a main table record. Qualified tables offer self-configuring, out-of-the-box support for multiple prices (including quantity price breaks), cross-reference part numbers and other distributor/supplier/customer-specific information for example.

When used for multiple prices or cross reference part numbers, qualified tables and qualifiers allow you to store a massive amount of potentially sparse data, by eliminating N fields from the main table and replacing them with a single qualified lookup field into a qualified table that has N corresponding records and one or more qualifiers. For example, N price fields, one for each distributor or quantity price break (or worse, each distributor/quantity price break combination) can be replaced with N qualified table records, one for each distributor/quantity price combination, and a qualifier for the price. Consider first the main table of product records shown in the following table that contains sparse quantity pricing data for each product.

| SKU | Name | 1-9 | 1-24 | 1-49 | 10-24 | 25-49 | 50-99 |
|---|---|---|---|---|---|---|---|
| 113 | Widget | $3.51 | | | $3.48 | $3.44 | $3.40 |
| 114 | Wrench | | $8.75 | | | $8.30 | $7.99 |
| 115 | Bearing | | | $5.12 | | | $4.80 |

Using a qualifier to store the quantity pricing data, the qualified table would have a single field Quantity and a single qualifier Price, and would contain the quantity records shown in the following table.

Pricing:

| Quantity | [Price] |
|---|---|
| 1-9 | |
| 1-24 | |
| 1-49 | |
| 10-24 | |
| 25-49 | |
| 50-99 | |

A qualified lookup field in the main table would replace all of the quantity price fields, and the pricing data would be stored as qualifier values associated with main table/qualified table links, as shown in the following table.

| SKU | Name | Lookup [Pricing] |
|---|---|---|
| 113 | Widget | 1-9; $3.51 |
| | | 10-24; $3.48 |
| | | 25-49; $.344 |
| | | 50-99; $3.40 |
| 114 | Wrench | 1-24; $8.75 |
| | | 25-49; $8.30 |
| | | 50-99; $7.99 |
| 115 | Bearing | 1-49; $5.12 |
| | | 50-99; $4.80 |

Qualified Table Terminology:

| Term | Definition |
|---|---|
| Qualified Table | A flat table type that supports qualifiers. |
| Qualified Table Field | One of the fields of the qualified table that applies to each record of the table. |
| Qualifier | One of the link-specific fields of the qualified table; qualified values exist only for main table/qualified table links. |
| Qualified Table Record | An actual record of the qualified table; includes field values but not qualifier values. |
| Qualified Lookup Field | A field in the main table that is a lookup into the records of the qualified table. |
| Fully Qualified Lookup Value | The fully-qualified value of the lookup field, consisting of values for both the display fields of the qualified table and its link-specific qualifiers. |
| Qualified Lookup Record | The qualified table record corresponding to the qualified lookup value; multiple instances of each qualified table record can be linked to each main table record. |
| Qualified Lookup Search Tab | The drill-down search tab in Record mode corresponding to the qualified lookup field. |
| Qualified Lookup Cell | The specialized Record Detail tab cell in Record mode that displays the values of the qualified lookup field. |
| Qualified Lookup Selector Dialog | The selector dialog that opens when you double-click on a qualified lookup cell to edit the values of a qualified lookup field. |

A product family is a group of main table records that are related by one or more common fields and/or attributes having the same value, and that may also have additional fields of family data, such as an image, a logo, a paragraph of descriptive text, bullets of specifications, and so on. Product families enable master data to be efficiently published not only to paper, but also to non-paper media such as the Web in a manner that preserves the presentation and organization seen in printed catalogs, with the added benefit of fast, efficient search.

The extended SQL database also supports multi-audience data that fully addresses all of the requirements for multiple languages and culture specific information. Embodiments utilize Unicode implementation that supports both Western and Eastern languages, reflects a data model with multiple language layers that avoids data duplication while ensuring data integrity, and features an innovative user interface that offers flexibility and efficiency during the entry, editing, browsing, and publishing of multilingual data. Moreover, multilingual support not only accommodates multiple languages, but also all the myriad other dimensions of regionalization, as follows:

Multiple languages supported by store regional information for one or more languages, including country-specific versions of the same language (e.g. English [US] and English [UK]).

Multiple regions supported for multiple instance layers of the same language, for parallel support of regional dialects, expressions, and slang.

Multiple cultures supported for example to accommodate regional requirements, such as when an image contains a human subject whose ethnicity should match the target audience.

Multiple regulations supports requirements that have nothing to do with language or culture, but rather with regulatory requirements, such as the restriction in France on showing a photo of a hypodermic needle.

Thus regardless of the specific requirement, multilingual support makes it possible to efficiently store all of the dimensions of audience-specific information within a single repository.

Multi-audience support includes:
Multi-byte Unicode implementation
Unlimited number of languages and locales
Support for character sets and sort order
Multi-layered data model
Single instance of each record
Language-centric view with multilingual data entry
Side-by-side multilingual comparison
Inheritance scheme for missing data
Multilingual repository metadata
Multilingual repository data
Multilingual publishing through APIs and portlets
Multilingual GUI software
Multi-Byte Unicode Implementation Multilingual support adheres to and is implemented using the latest Unicode 4.0 standard, which provides full multi-byte encoding, supports the equivalent of code pages and double-byte languages within a single unified architecture, and continues all the way through and to the underlying DBMS with which the extended SQL database interfaces. An individual repository can be defined as storing data for an effectively unlimited number of languages, chosen from a list of languages and locales recognized by the system (e.g. English [US] and English [UK]), including both western European and Eastern languages. Each language selection defines not only the language name, but also the underlying character set applicable to that language, the ability to properly display and perform data entry within the foreign character set, other language-specific details (such as sort order and a language-specific linguistic engine for keyword stemming), and finally, localization details (such as the decimal and thousands separators and a localized spell-check dictionary).

Multi-Layered Data Model

Once a repository has been defined as multi-audience, the extended SQL database implements a "multi-layered" data model to store the multilingual information. Specifically, for each multilingual field, the single instance of each record contains a distinct data bucket for each language, and values can be entered for any or all of the defined languages at any time.

And because each individual record embodies all of the multilingual information for the record, a lookup value (such as a category) or an object (such as a text block) must be linked to and associated with a master data record just once for all languages rather than once for each language, avoiding unnecessary effort and potential for error.

Language-Centric Views

Each user of the system sees a "language-centric" view of the repository data and metadata. For example, one user can be entering and editing data in French while a second user is searching and browsing the repository in Japanese. At the same time, within the language-centric view, a multilingual Language Detail tab within the database client provides for multilingual data entry and a side-by-side comparison of the multilingual data.

Finally, an innovative inheritance scheme displays and color-codes data from other language layers for missing data in the current language, with an inheritance ordering for each language during data entry, editing, and browsing, and an inheritance threshold for published catalogs.

Multilingual Repository Metadata

Within the multi-layered data model, not only the data but also all of the repository metadata can be stored in multiple languages, for a consistent user experience in each language.

Language-specific metadata includes:
Table names
Field names
Category names
Attribute names
Attribute text values
Multilingual Repository Data Within a multilingual repository, data can be stored in multiple languages for the applicable data types, as follows:

Numeric fields. Naturally, numeric fields do not require a distinct value for each language and are always non-lingual. Meanwhile, measurements are also non-lingual because they may utilize built-in library of dimensions and units within the extended SQL database.

Text fields. A text field can be flagged as non-lingual, so that a single value is stored and used for all languages (such as for a part number field), or as multilingual, to support storing a distinct value for each language (such as for a product name field).

In summary, embodiments of the invention utilize the extended data types defined above to implement the extended SQL database. The schema generated may hide as much or as little of the specific schema of the extended SQL database to provide easy or complex interfacing that allows for as much of the complexity to be hidden as possible depending on the intended application. For example, for a web service based search tool, there is no need to provide a comprehensive XSD interface when only a few search terms are to be provided. In addition, a flattened output result set may be returned in markup that hides the indirect constructs of the schema and other optimizations to provide a search result quickly displayable on any platform anywhere.

The XSD generated may include data elements that capture key-mapping which allows for the storage of remote system identifiers of objects. The identifiers may map to objects that were imported into the system from a remote system or that are created within the system and which may be exported via XSD. This allows for rapid harmonizing of data between systems. In addition, the XSD generated may include XSD data elements that capture parent-child relationships between any of the hierarchy, taxonomy or family tables for example. Any other parent-child relationship that exists in the extended SQL database may also be utilized with XSD data elements to generate parent-child populated XSD. The taxonomy for example may be generated where each and every attribute is captured as a single XSD data element or alternatively where all taxonomy attributes are aggregated and captured in a single repeatable XSD data element. Furthermore, the generated XSD may also include data elements which capture multilingual attributes and fields for any number of cultures, regions, languages, or any other multi-audience related object. Enumeration lists that include values from remote systems may also be utilized to generated XSD.

Alternatively, the system allows for the exclusion of any desired structures from the resulting generated XSD interface. This allows for the simplification of the schema which enables simplified views of the database for more user friendly searching for example.

BRIEF DESCRIPTION OF THE DRAWINGS

The above and other aspects, features and advantages of the invention will be more apparent from the following more particular description thereof, presented in conjunction with the following drawings wherein:

FIG. 9 shows a view of the "Countries" flat lookup table.

FIG. 10 shows a view of the "Address" qualified lookup table.

FIG. 11 shows a view of the "key mappings" popup that determines the source of the enumeration values utilized in generating the database interface.

DETAILED DESCRIPTION

A database interface generator will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

One or more embodiments of the invention enable a database generator interface that is configured to map complex constructs and semantics so that internal complexities are hidden while providing for efficient internal storage and speed. Embodiments of the invention extract and analyze complex relationships in a database and expose the schema as XSD to allow for interfacing with the database while maintaining the internal efficiency of the complex structures utilized by the database. The system presents a list of tables and fields that exist in the database and accepts user input to determine which tables and fields to create an interface for. In addition, lookup fields are listed which allow for user input for specifying which fields to create XSD enumeration lists for. Alternatively or in combination, external databases may be utilized to create XSD enumeration lists for a given lookup. The generated XSD file may be saved and utilized by other mapping tools to allow for the interfacing with other databases. For example, creating XSD enumeration lists allows for value mapping operations to convert the values of one database to the values of another database. Mapping the schema of an extended SQL database allows for users with limited understanding of the internals of the extended SQL database to connect the database to other systems using commonly available tools. Embodiments of the invention may be coupled with web services to provide for universal access to the database from any platform from any location.

Figure 1:
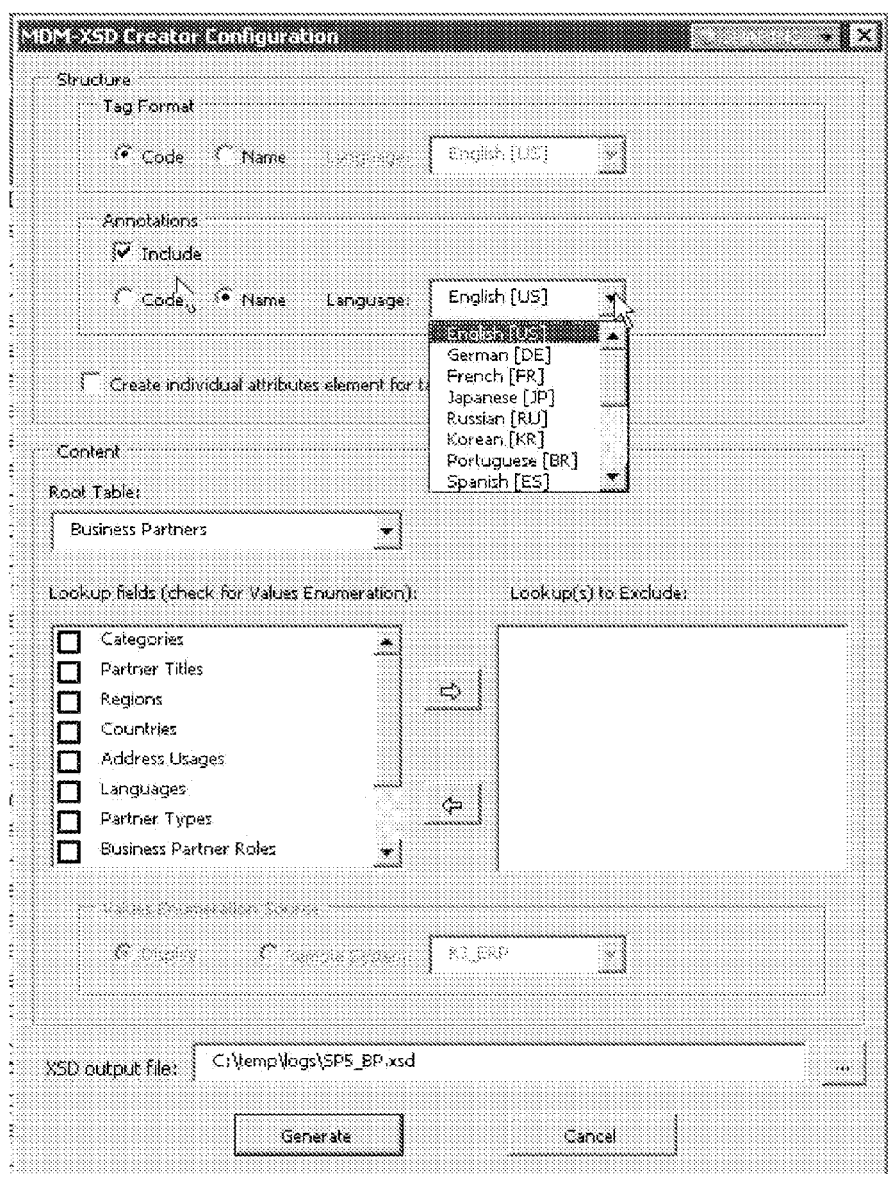
FIG. 1 shows a graphical user interface utilized by an embodiment of the invention to generate a database interface, here shown setting the annotation audience.

FIG. 1 shows a graphical user interface utilized by an embodiment of the invention to generate a database interface, here shown setting the annotation audience. As shown the audience is specific to a language and country in this embodiment, however, further delineation by region, culture and regulation may be utilized in other embodiments to provide further granularity to the target audience. As previously described in the brief summary, language, region, culture and regulation selections provide this granularity. For example, multiple languages may include entirely different languages or even country-specific versions of the same language (e.g. English [US] and English [UK]). Multiple regions are supported for multiple instance layers of the same language, for parallel support of regional dialects, expressions, and slang. Multiple cultures are supported for example to accommodate regional requirements, such as when an image contains a human subject whose ethnicity should match the target audience. Multiple regulations supports audience scenarios independent of language or culture, but rather with regulatory requirements, such as the restriction in France on showing a photo of a hypodermic needle. In the embodiment shown, the interface is a pop from a plug-in to a spreadsheet so that the schema may be read in and displayed in an existing spreadsheet application.

Figure 2:
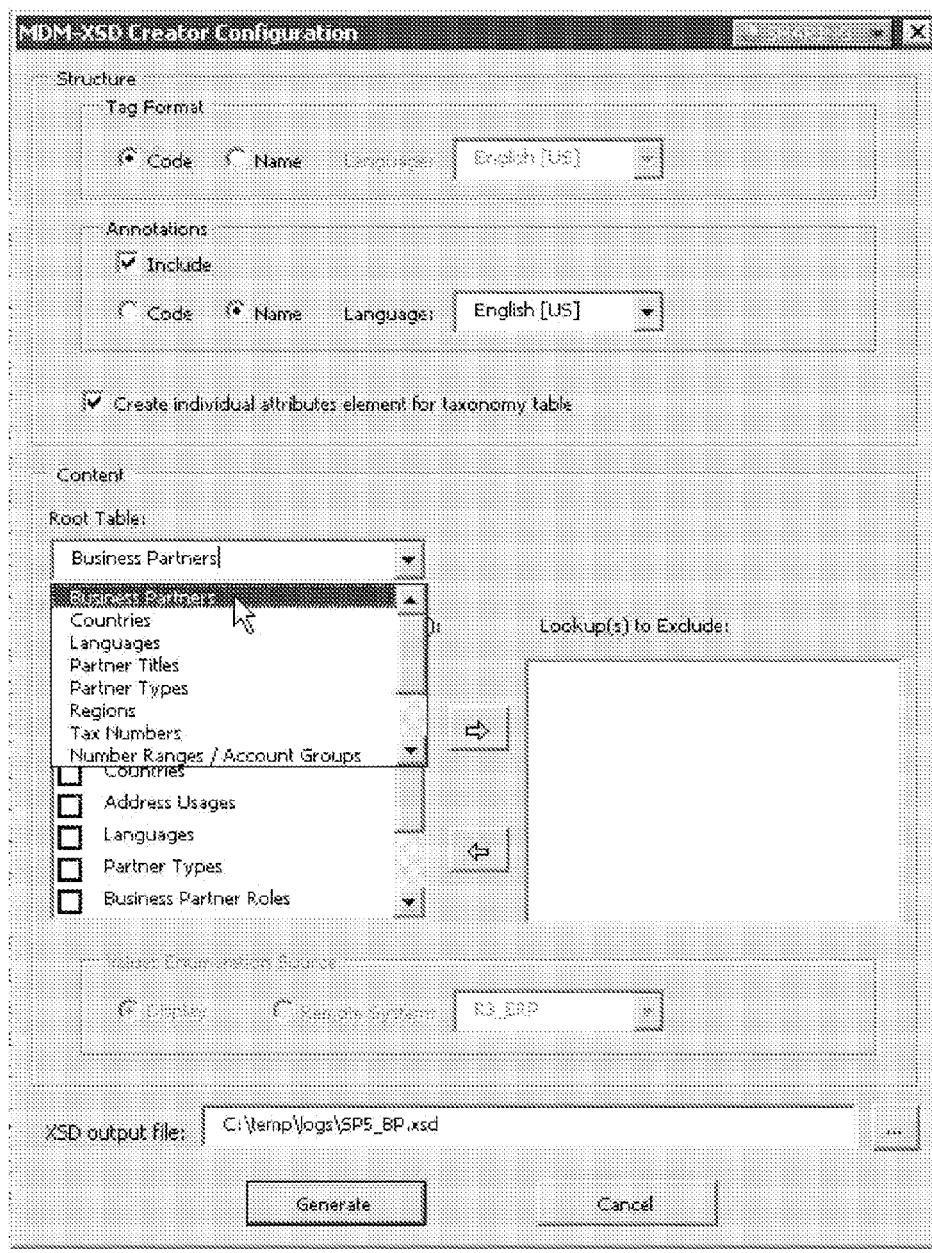
FIG. 2 shows a graphical user interface utilized by an embodiment of the invention to generate a database interface, here shown setting the root table to utilize for generating the interface.

FIG. 2 shows a graphical user interface utilized by an embodiment of the invention to generate a database interface, here shown setting the root table to utilize for generating the interface. Any number of tables or one table may be utilized. The more data exposed, the more searching and external capabilities are provided. The schema is queried and the list of tables is presented based on this information. In addition, the "Create individual attributes . . . " check box is asserted so that each attribute in the taxonomy table is generated as an individual XSD element. Without checking this checkbox, the taxonomy objects may be aggregated and captured in a single repeatable XSD data element for example.

Figure 3:
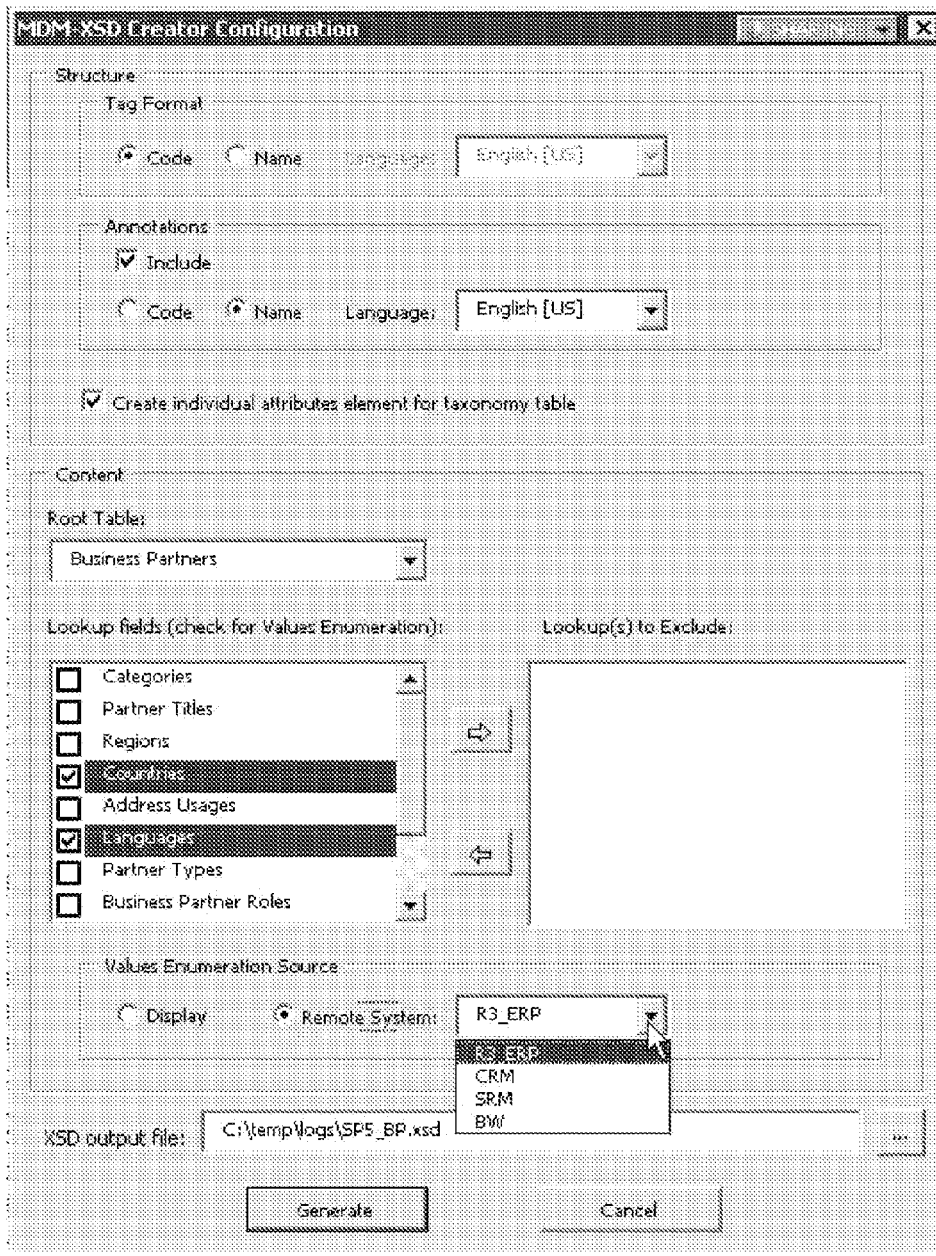
FIG. 3 shows a graphical user interface utilized by an embodiment of the invention to generate a database interface, here shown setting the lookup fields to utilize for value enumeration.

FIG. 3 shows a graphical user interface utilized by an embodiment of the invention to generate a database interface, here shown setting the lookup fields to utilize for value enumeration. As non-standard SQL lookup fields are encountered in the schema, they are presented in the list of lookup fields. Selection of a lookup table allows for the generation of content in addition to schema layout. In addition, the enumeration source is set in the content interface to allow for utilization of external lookup values that correspond to an external system, i.e., a remote database. Alternatively, the "Display" radio button allows for displaying local enumeration values from a local data source for example. This allows for use of consistent values as defined in a remote system.

Figure 4:
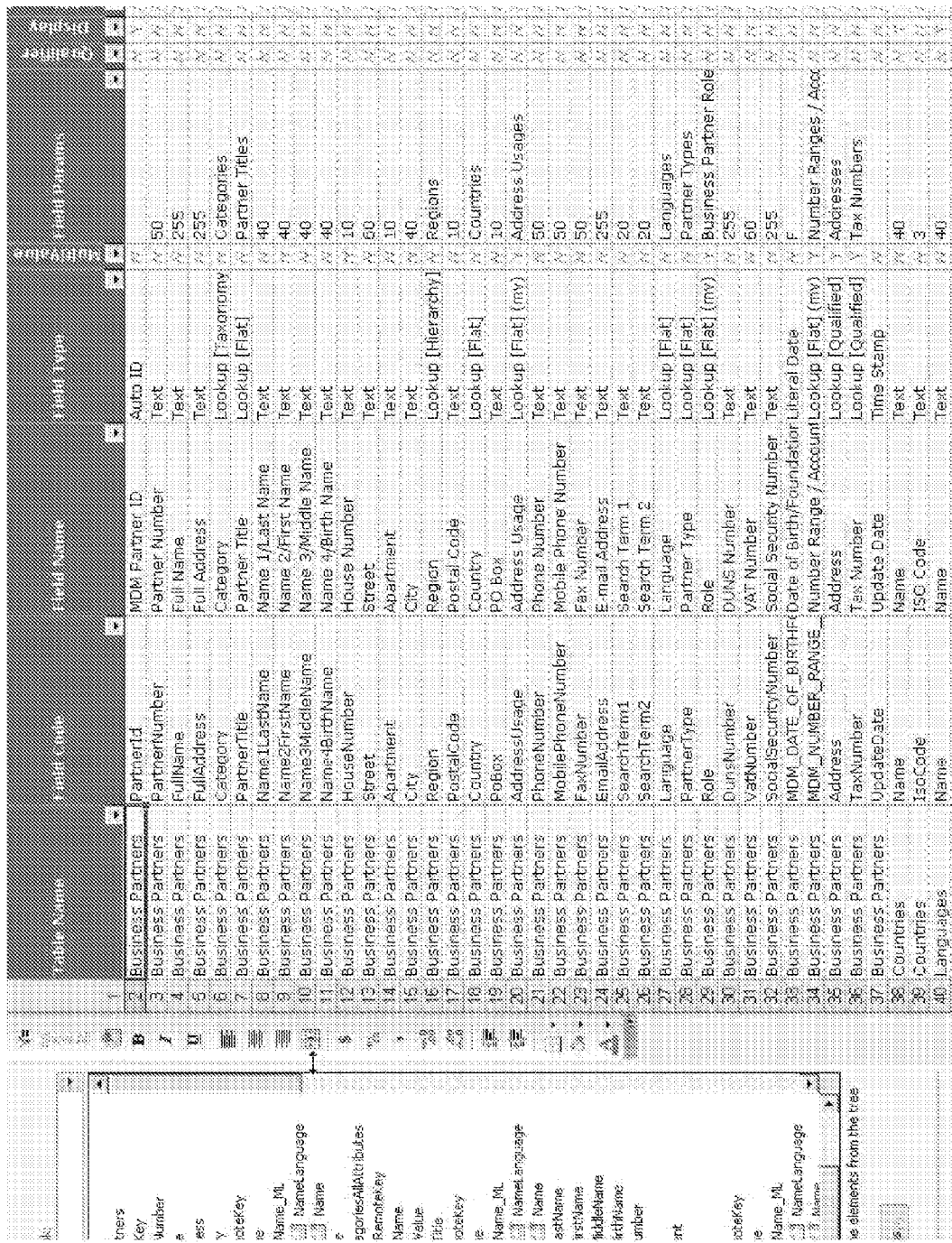
FIG. 4 shows a tabular view of the field code, name, types and parameters for selected tables along with a tree view of the generated schema interface.

FIG. 4 shows a tabular view of the field code, name, types and parameters for selected tables along with a tree view of the generated schema interface. The tree view is shown on the left side of the diagram and the field specific information is shown on the right. The field-specific information includes non-standard SQL field types as shown in the "Field Type" column associated with each field. See the brief summary for tables that describe the types of non-standard types utilized by embodiments of the invention. In the embodiment shown, the schema has been displayed in an off the shelf spreadsheet program. Any type of display may be utilized to show the data in the schema in other embodiments of the invention.

Figure 5:
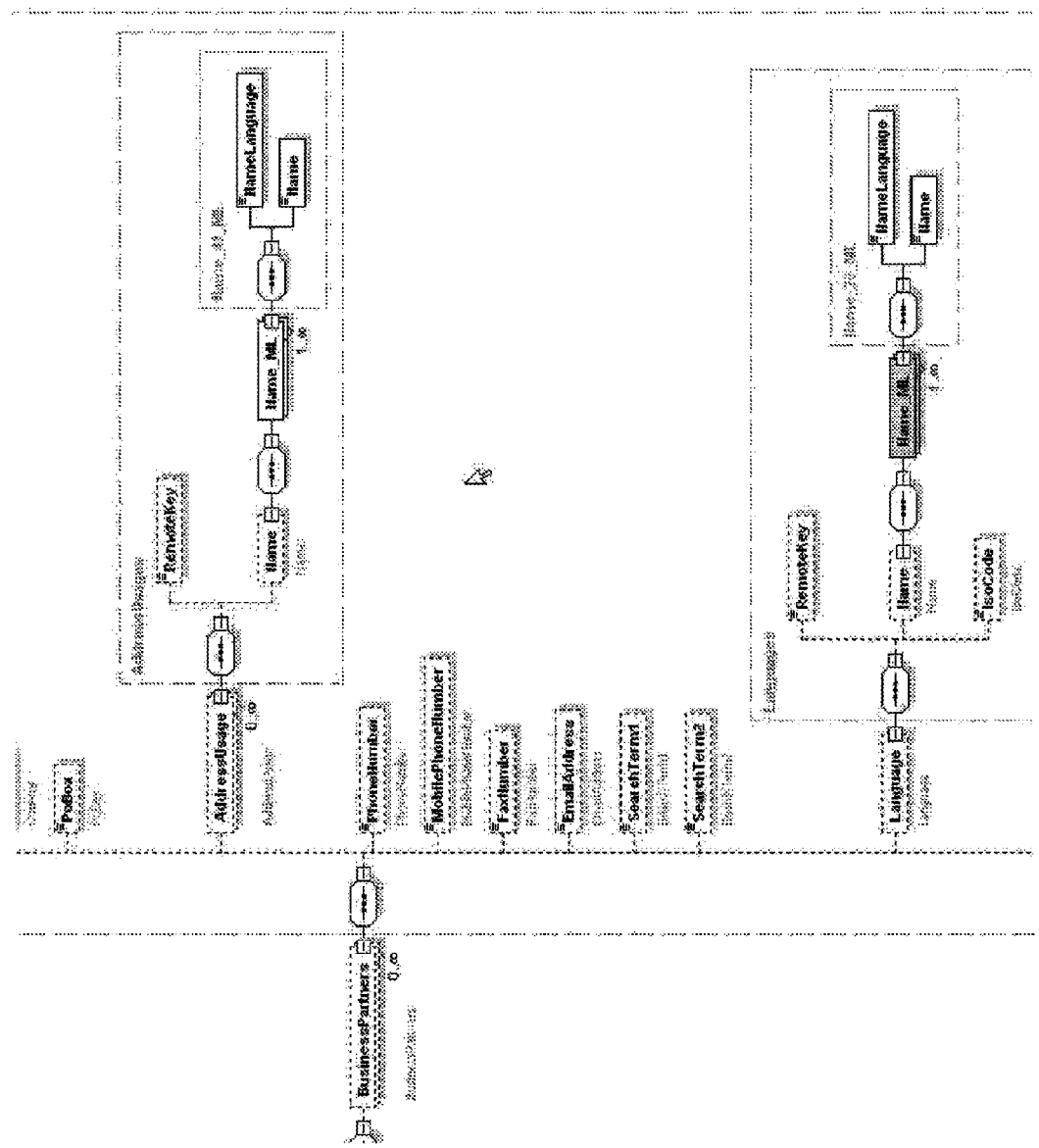
FIG. 5 shows an entity relation diagram for the Business Partners table schema showing the "BusinessPartners" table on the left and the exploded view of the table on the right.

FIG. 5 shows an entity relation diagram for the generated Business Partners table XSD schema showing the "Business-Partners" table on the left and the exploded view of the table on the right. This view corresponds to the generated XSD tree view shown on the left of the spreadsheet in FIG. 4. Here the "Language" element is exploded to show that the "IsoCode", and "NameLanguage" and "Name" are exposed. "Name_ML" is a "Multi-Lingual" version of "Name" that allows for multiple audience support. "IsoCode" may include country codes and may also be augmented with more specific region, culture and regulatory codes that further narrow the audience. In this figure, the "Name" field may be exposed only by flattening or otherwise simplifying the structure based on an input code that specifies the audience that the interface is to be exposed to. This allows for simplified search interfaces that only have a name search field instead of requiring an audience selector. Any data structure may be excluded from the generated output in order to simplify the generated XSD to the desired granularity.

Figure 6:
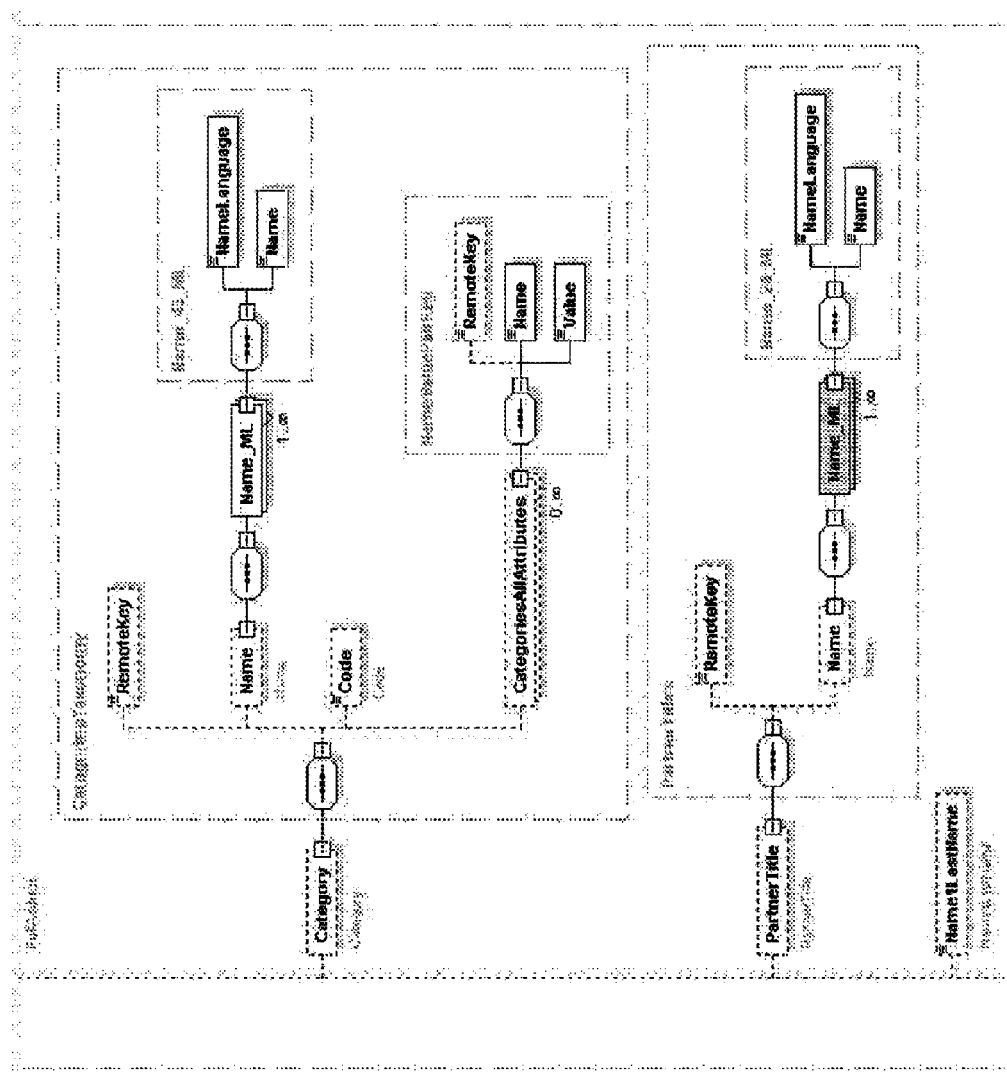
FIG. 6 shows a further view of the entity relationship diagram of FIG. 5, namely the "Category" and "PartnerTitle" constructs.

FIG. 6 shows a further view of the entity relationship diagram of FIG. 5, namely the "Category" and "PartnerTitle" generated XSD constructs. In this example, the resulting schema generated may include the entire construct "CategoriesTaxonomy" or may be simplified based on knowledge of the audience that the interface is intended for. For example, the "NameValuePairKey" may or may not be exposed based on the configured level of user that is accessing the system. For example, if an expert user is accessing the system, then the "NameValuePairKey" may be utilized for altering the categories. For a simple search user, the "RemoteKey" may simply be exposed that sets a category on which to search. Any simplification of the generated interface based on an intended audience as determined in any manner is in keeping with the spirit of the invention. For example, use of a configuration parameter, passed-in parameter, cookie, web service or java bean parameter or user input parameter from an end user or interface generator are examples of inputs that allow for interface simplification.

Figure 7:
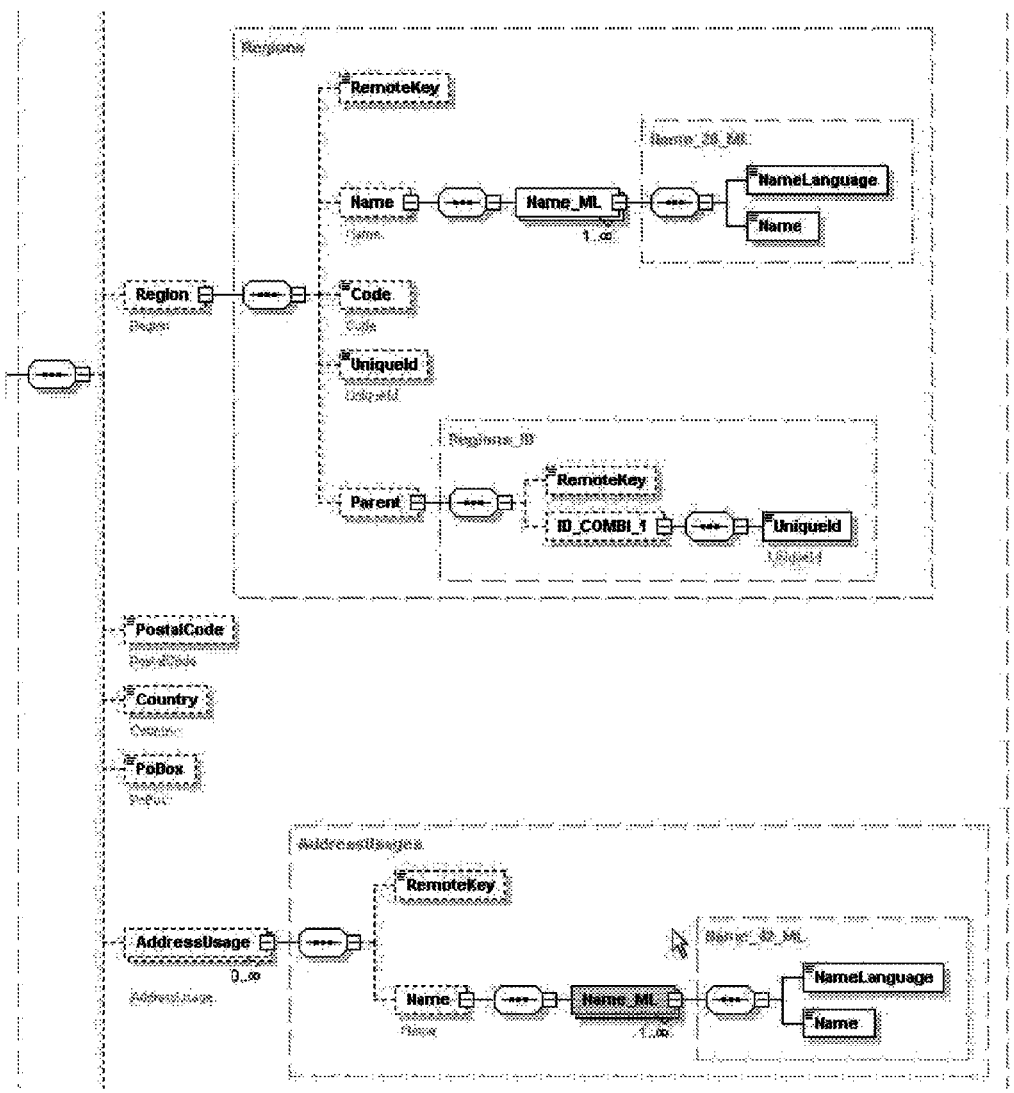
FIG. 7 shows a further view of the entity relationship diagram of FIG. 5, namely the "Region" and "AddressUsage" constructs.
Figure 8:
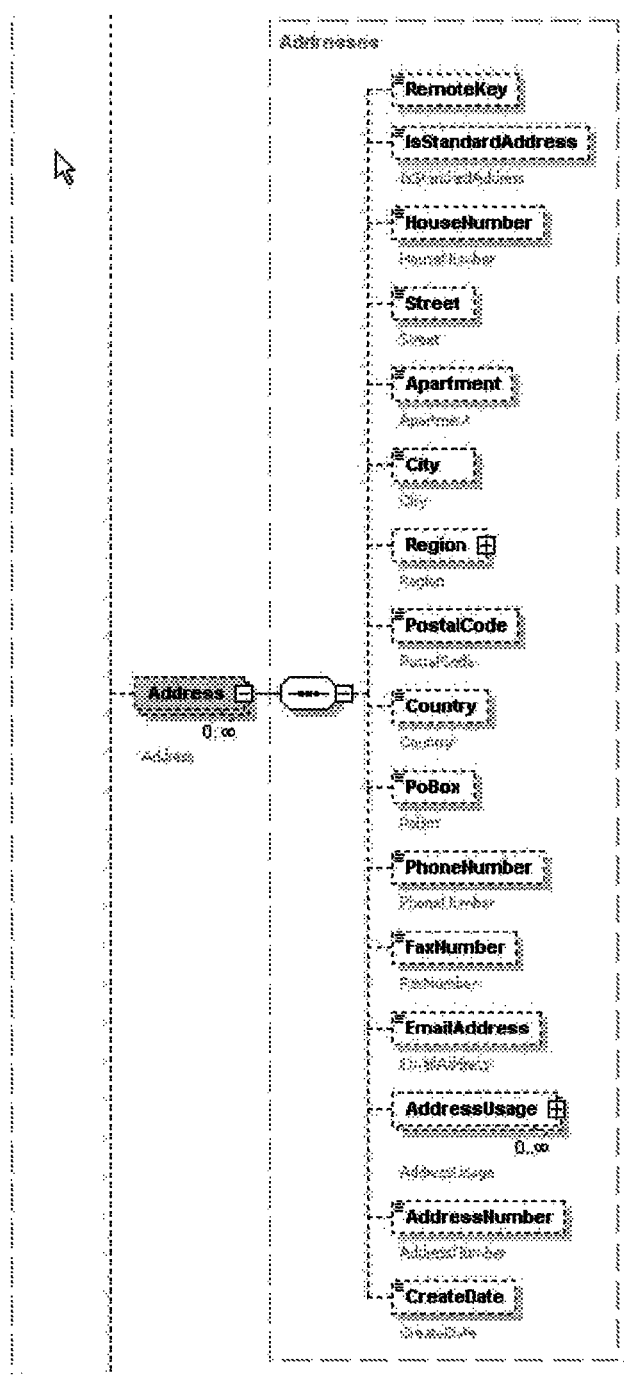
FIG. 8 shows a further view of the entity relationship diagram of FIG. 5, namely the "Address" construct.

FIG. 7 shows a further view of the entity relationship diagram of FIG. 5, namely the "Region" and "AddressUsage" constructs. Similarly, the "Regions_ID" may be exposed or not based on the intended audience. FIG. 8 shows a further view of the entity relationship diagram of FIG. 5, namely the "Address" construct that makes use of the "AddressUsage" and "Region" constructs.

Figure 9:
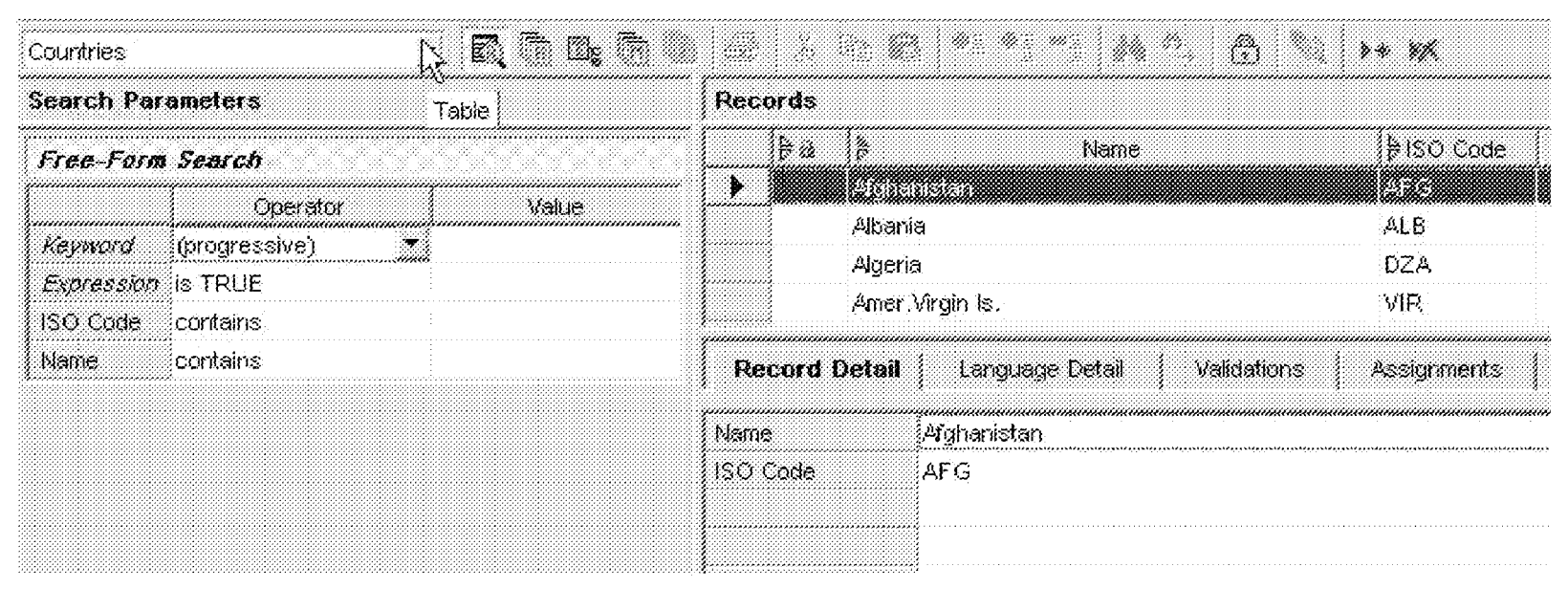

FIG. 9 shows a view of the "Countries" flat lookup table in the extended SQL database showing the "Name" and "IsoCode" fields for a variety of example countries. FIG. 10 shows a view of the "Address" qualified lookup table. The right side of the diagram near the cursor shows two qualified addresses. By holding the cursor over the second address a verbose popup shows all of the field values. In this case, the lookup may hold a home and business address external to the record.

Figure 11:
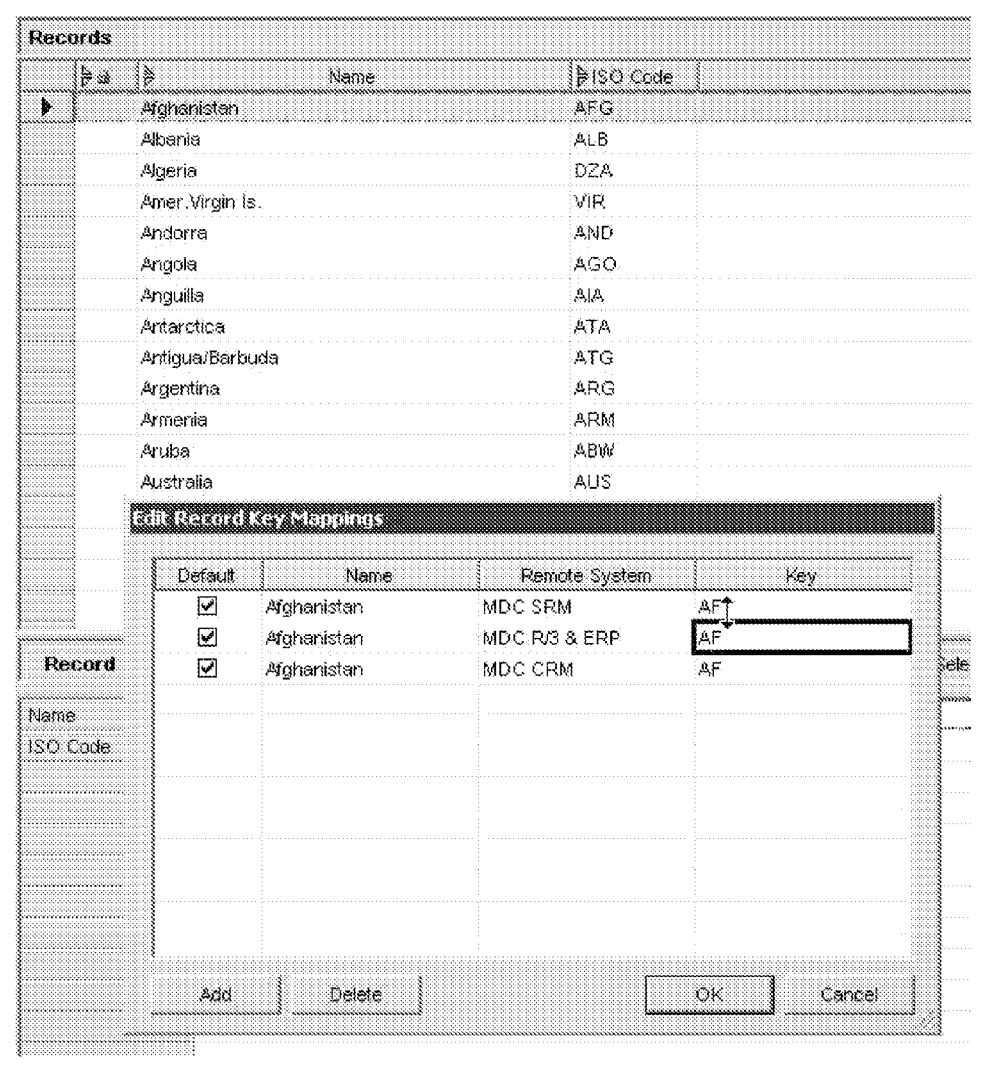

FIG. 11 shows a view of the "key mappings" popup that determines the source of the enumeration values utilized in generating the database interface. In this case, the three "remote systems" hold the same "keys", however this need not be the case and embodiments of the invention allow a user to select which remote system to obtain enumeration values from for generating the interface. The XSD generated may include data elements that capture key-mapping which allows for the storage of remote system identifiers of objects. The identifiers may map to objects that were imported into the system from a remote system or that are created within the system and which may be exported via XSD. This allows for rapid harmonizing of data between systems. In addition, the XSD generated may include XSD data elements that capture parent-child relationships between any of the hierarchy, taxonomy or family tables for example. Any other parent-child relationship that exists in the extended SQL database may also be utilized with XSD data elements to generate parent-child populated XSD. The taxonomy for example may be generated where each and every attribute is captured as a single XSD data element or alternatively where all taxonomy attributes are aggregated and captured in a single repeatable XSD data element. Furthermore, the generated XSD may also include data elements that capture multilingual attributes and fields for any number of cultures, regions, languages, or any other multi-audience related object. Enumeration lists that include values from remote systems may also be utilized to generated XSD.

Embodiments of the invention may be implemented with a computer program product for generating the database interface. The computer program product may run on any type of computer. The computer program product runs on the computer in a computer usable memory medium and is implemented with computer readable program code embodied therein. The computer readable code is configured to obtain a schema associated with an extended SQL database. The computer readable code is configured to display a generation interface on a first computer wherein the generation interface includes a structure interface, a content interface and an output interface. The structure interface generally includes a tag format interface and an annotation interface which comprises an audience selector. The content interface generally includes a table interface and a list of lookup fields and an enumeration source interface. The output interface generally includes an output filename element. The computer readable code is further configured to present at least one audience in the audience selector. The computer readable code is also configured to present at least one table name in the table interface, present at least one lookup field in the list of lookup fields and present at least one enumeration source in the enumeration source interface. The computer readable code is also configured to accept at least one input in the generation interface and, generate an interface based on the at least one input.

The generated XSD shown in FIGS. 4-8 is as follows. In this listing, the elements shown in FIGS. 4-8 can be found below, for example AddressUsage as shown in second type from the top on FIG. 5 is detailed at paragraph [263] below which utilizes the type "AddressUsages" (note trailing "s") which is detailed at paragraph [890]. One skilled in the art of XML and XSD will readily trace through FIGS. 4-8 to find the implementation detailed below.

What is claimed is:

1. A computer program product for generating a database interface comprising a computer usable memory medium having computer readable program code embodied therein wherein said computer readable program code is configured to:

obtain a schema associated with an extended SQL database comprising one or more main database tables and a plurality of sub-tables, wherein said extended SQL database comprises one or more advanced constructs comprising one or more structural optimizations of said one or more primary table using said plurality of sub-tables;
display a generation interface on a first computer wherein said generation interface comprises a structure interface, a content interface and an output interface;
said structure interface comprising a tag format interface and an annotation interface comprising an audience selector, wherein said extended SQL database supports multi-audience data for one or more audiences, wherein the multi-audience data is stored in a plurality of language layers to avoid data duplication between said plurality of language layers;
said content interface comprising a table interface and a list of lookup fields and an enumeration source interface, wherein at least one of said one or more advanced constructs is flattened to expose said one or more main database tables as a flat record;
said output interface comprising a output filename element;
present at least one audience in said audience selector;
present at least one table name in said table interface;
present at least one lookup field in said list of lookup fields;
present at least one enumeration source in said enumeration source interface;
accept at least one input in said generation interface; and,
generate an interface to said extended SQL database into XSD based on said at least one input.

2. The computer program product of claim 1 wherein said computer readable program code is further configured to accept any combination of language, region, culture or regulation selection that identifies one of said one or more audiences in said audience selector.

3. The computer program product of claim 1 wherein said one or more advanced constructs comprise one or more taxonomy, hierarchy or qualified lookup table comprising a pool of associated attributes, wherein at least one of said associated attributes is presented in said list of lookup fields.

4. The computer program product of claim 1 wherein said one or more advanced constructs comprise one or more multi-value lookup tables configured to store multiple separate values in one field, wherein at least one attribute associated with said multiple separate values is presented in said list of lookup fields.

5. The computer program product of claim 1 wherein said computer readable program code is further configured accept said at least one input wherein said at least one input is associated with a non-standard SQL type.

6. The computer program product of claim 1 wherein said computer readable program code is further configured to generate said interface by simplifying at least one of said advanced constructs.

7. The computer program product of claim 1 wherein said computer readable program code is further configured to generate said interface by flattening at least one construct in said schema.

8. The computer program product of claim 1 wherein said computer readable program code is further configured to generate said interface by obtaining data from said at least one enumeration source wherein said at least one enumeration source is a remote database.

9. The computer program product of claim 1 wherein said XSD comprises key-mapping data elements that includes an identifier of an object.

10. The computer program product of claim 1 wherein said computer readable program code is further configured to generate said interface into XSD and wherein said XSD comprises data elements to capture a parent-child relationship.

11. The computer program product of claim 1 wherein said computer readable program code is further configured to generate said interface into XSD and wherein said XSD comprises data elements to capture multi-audience values.

12. The computer program product of claim 1 wherein said computer readable program code is further configured to generate said interface into XSD and wherein said XSD comprises data elements to capture a taxonomy attribute structure as a individual XSD data elements or as an aggregation in a single XSD data element.

13. The computer program product of claim 1 wherein said computer readable program code is further configured to generate said interface into XSD and wherein said XSD comprises data elements to capture remote enumeration lists.

14. The computer program product of claim 1 wherein said computer readable program code is further configured exclude structures from generation into XSD.

15. A computer program product for generating a database interface comprising a computer usable memory medium having computer readable program code embodied therein wherein said computer readable program code is configured to:
obtain a schema associated with an extended SQL database comprising one or more main database tables and a plurality of sub-tables, wherein said extended SQL database comprises one or more advanced constructs comprising one or more structural optimizations of said one or more primary table using said plurality of sub-tables;
display a generation interface on a first computer wherein said generation interface comprises a structure interface, a content interface and an output interface;
said structure interface comprising a tag format interface and an annotation interface which comprises an audience selector;
said content interface comprising a table interface and a list of lookup fields and an enumeration source interface;
said output interface comprising a output filename element;
present at least one audience in said audience selector;
accept an audience selection in said audience selector wherein said audience selection includes a language selection, region selection, culture selection or regulation selection, wherein said extended SQL database supports multi-audience data for one or more audiences, wherein the multi-audience data is stored in a plurality of language layers to avoid data duplication between said plurality of language layers;
present at least one table name in said table interface;
present at least one lookup field in said list of lookup fields, wherein at least one of said one or more advanced constructs is flattened to expose said one or more main database tables as a flat record;
present at least one enumeration source in said enumeration source interface;
accept at least one input in said generation interface; and,
generate an interface to said extended SQL database into XSD based on said at least one input.

16. The computer program product of claim 15 wherein said one or more advanced constructs comprise one or more taxonomy, hierarchy or qualified lookup table comprising a pool of associated attributes, wherein at least one of said associated attributes is presented in said list of lookup fields.

17. The computer program product of claim 15 wherein said computer readable program code is further configured accept said at least one input wherein said at least one input is associated with a non-standard SQL type.

18. The computer program product of claim 15 wherein said computer readable program code is further configured to generate said interface by simplifying at least one construct in said schema.

19. A computer program product for generating a database interface comprising a computer usable memory medium having computer readable program code embodied therein wherein said computer readable program code is configured to:

obtain a schema associated with an extended SQL database comprising one or more main database tables and a plurality of sub-tables, wherein said extended SQL database comprises one or more advanced constructs comprising one or more structural optimizations of said one or more primary table using said plurality of sub-tables;

display a generation interface on a first computer wherein said generation interface comprises a structure interface, a content interface and an output interface;

said structure interface comprising a tag format interface and an annotation interface which comprises an audience selector;

said content interface comprising a table interface and a list of lookup fields and an enumeration source interface;

said output interface comprising a output filename element;

present at least one audience in said audience selector;

accept an audience selection in said audience selector wherein said audience selection includes a language selection, region selection, culture selection or regulation selection, wherein said extended SQL database supports multi-audience data for one or more audiences, wherein the multi-audience data is stored in a plurality of language layers to avoid data duplication between said plurality of language layers;

present at least one table name in said table interface;

present a flat lookup table, taxonomy table, hierarchy table or qualified lookup table in said list of lookup fields, wherein at least one of said one or more advanced constructs is flattened to expose said one or more main database tables as a flat record;

present at least one enumeration source in said enumeration source interface;

accept at least one input in said generation interface wherein said at least one input is associated with a non-standard SQL type; and, generate an interface to said extended SQL database into XSD based on said at least one input by simplifying at least one construct in said schema.

* * * * *